United States Patent [19]

Kazlauskas

[11] Patent Number: 4,810,848
[45] Date of Patent: Mar. 7, 1989

[54] TUBE WELDER

[76] Inventor: Gasparas Kazlauskas, 24620 Palermo Dr., Calabasas, Calif. 93108

[21] Appl. No.: 117,815

[22] Filed: Nov. 6, 1987

[51] Int. Cl.$^4$ ............................................. B23K 9/02
[52] U.S. Cl. ................... 219/60 A; 219/61.1; 219/59.1
[58] Field of Search ................. 219/60 A, 60.2, 60 R, 219/158, 159, 161, 59.1, 61.1

[56] References Cited

U.S. PATENT DOCUMENTS 3,400,237  9/1968  Kazlaukas ........................ 219/60 A Primary Examiner—E. A. Goldberg
Assistant Examiner—Lincoln Donovan
Attorney, Agent, or Firm—Jack C. Munro

[57] ABSTRACT

An apparatus for welding together coaxial tube sections which includes a main housing within which is located a through opening within which is to be located the coaxial tube sections to be welded. A welding electrode is mounted within the main housing to be rotatable about the tube sections to effect the welding procedure. The welding electrode is mounted on a deflectable welding electrode mounting member which is to be moved to cause the welding electrode to physically contact the tubes in the welding area and then to be movable to cause the welding electrode to assume a spaced position establishing the desired welding arc. The coaxial tube sections are snugly held in position through the use of a metallic clamping plate arrangement. This clamping plate arrangement has formed therein a series of slots which is to provide for increased expansion of the size of the through opening so as to permit mounting of the tube welder on a greater size variance of tubes to be welded.

3 Claims, 5 Drawing Sheets

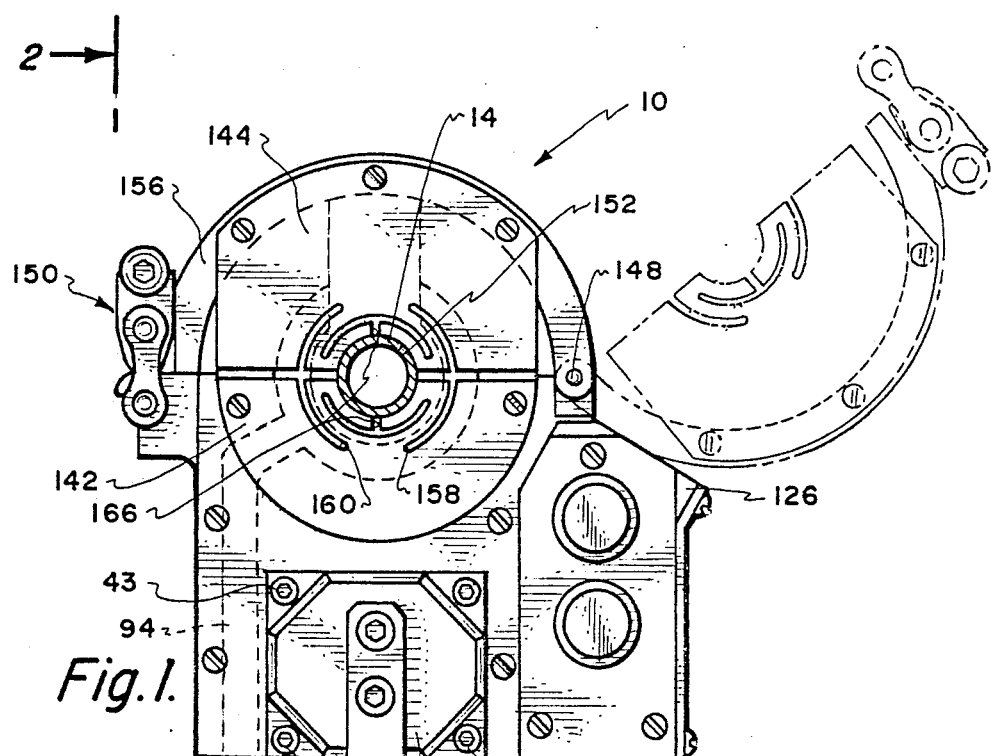
Fig. 1.
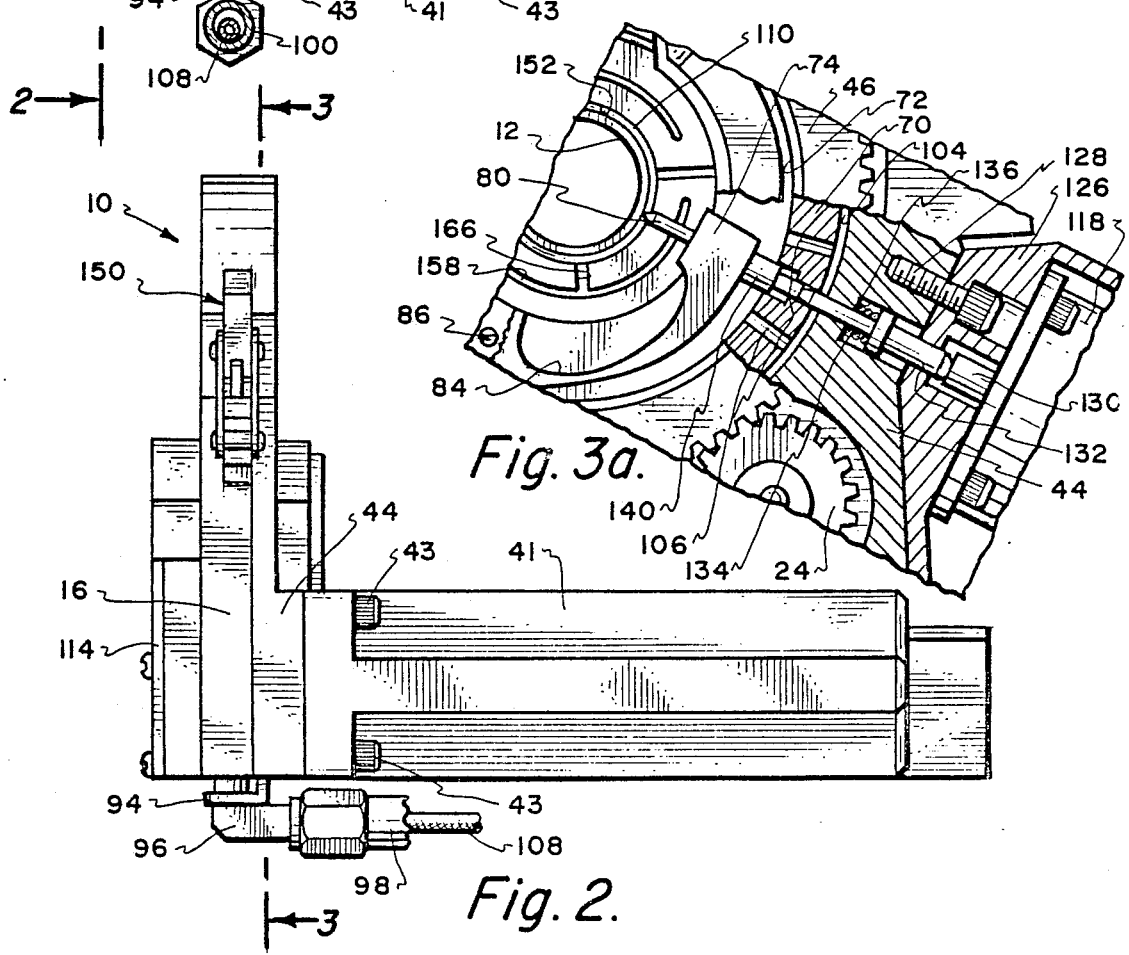
Fig. 3a.
Fig. 2.

TUBE WELDER

BACKGROUND OF THE INVENTION

The field of this invention relates to the welding of separate, coaxially located, edge abutting, metallic, cylindrical, tubular sections by the gas shielded tungsten electrode arc welding process. More particularly, the field of this invention contemplates an apparatus for automatic gas tungsten arc welding along a circumferential path thereby securing the tubular sections together forming essentially an integral, totally enclosed, tube.

The use of apparatuses to effect automatic welding of tubes has long been known. A common such apparatus is what is shown and described within U.S. Pat. No. 3,400,237, by the present inventor. The apparatus of the present invention is to employ a welding technique similar to the aforesaid Patent, and reference may be had to the aforesaid Patent for background information of the welding technique.

Previously, there have been two inherent disadvantages attributable to the tube welding apparatuses similar to the aforementioned Patent. One of these disadvantages is that, in order to establish the welding arc, it is required to apply a surge of electrical voltage. Once the arc is established, the voltage can be decreased. This surge is substantial and several times the amount of voltage that is required to maintain the arc once it is established. Because of this surge in voltage, it has not been advisable to use such tube welding equipment in conjunction with electronic equipment as the surge could easily "escape" and cause damage to the electronics within the electronic equipment.

The other disadvantage to tube welders of the aforesaid Patent is that they are limited to usage with only a close tolerance variation of size of tubing. For example, let it be assumed that the tube welder is designed to be used in conjunction with a one inch tube. This means that the welder will be able to clamp tightly onto any tube which is of a size of 0.995 inches to 1.005 inches. However, in the constructing of such tubes, it is common that one inch tubes will vary from this range of tolerances. Therefore, if a tube welder could be constructed that would easily be snugly affixable onto tubes that varied from 0.990 inches to 1.010 inches, that tube welder then would be usable in conjunction with a substantially increased number of tubes. Let it be assumed that the tube welder is to be utilized to make a thousand different welds thereby forming a thousand different tubes. If the tube welders are usable only from 0.995 to 1.005 inches, then possibly there will be two to three hundred tubes that the tube welder can not be used to effect the welding procedure. However, if the tube welder could be usable from 0.990 inches to 1.010 inches, then practically all the welds could be created.

SUMMARY OF THE INVENTION

A tube welder which utilizes a main housing within which is formed a through opening. Connecting with the through opening are two spaced apart pairs of clamping plates. Each pair of clamping plates are to be locatable in a snug fitting manner about a coaxial pair of edge abutting tubes which are to be welded. Each pair of clamping plates includes a series of circumferentially spaced apart slots which permits the clamping plates to expand to thereby be snugly mounted on a greater size variance of tubes which are to be welded. The edge abutting area of the tubes is in alignment with the welding electrode This welding electrode is mounted on an integral member which is deflectable relative to the main housing. This deflection is such as to cause the welding electrode to be movable to physically contact the tubes to be welded in the welding area. An adequate amount of welding voltage and current is supplied to the welding electrode which is sufficient to sustain the welding when the electrode is in its normal (slightly spaced) position from the welding area. This voltage and current is insufficient to initiate the arc. However, upon moving of the welding electrode to physically contact the tubes to be welded, the arc is initiated and as the welding electrode is moved to its slightly spaced position the desired welding arc is established and is maintained.

BRIEF DESCRIPTION OF THE DRAWINGS

FIG. 1 is a side view of the tube welder of the present invention taken in transverse cross-section and through the tube to be welded showing the moving of the clamping plates to effect installation and removal of the tubes to be welded in conjunction with the main housing of the welder;

FIG. 2 is a front view of the tube welder of the present invention taken along line 2—2 of FIG. 1;

FIG. 3a is a view of a portion of the structure of FIG. 3 showing the welding electrode in the position in contact with the tube to be welded in the welding area;

DETAILED DESCRIPTION OF THE SHOWN EMBODIMENT

Figure 3:
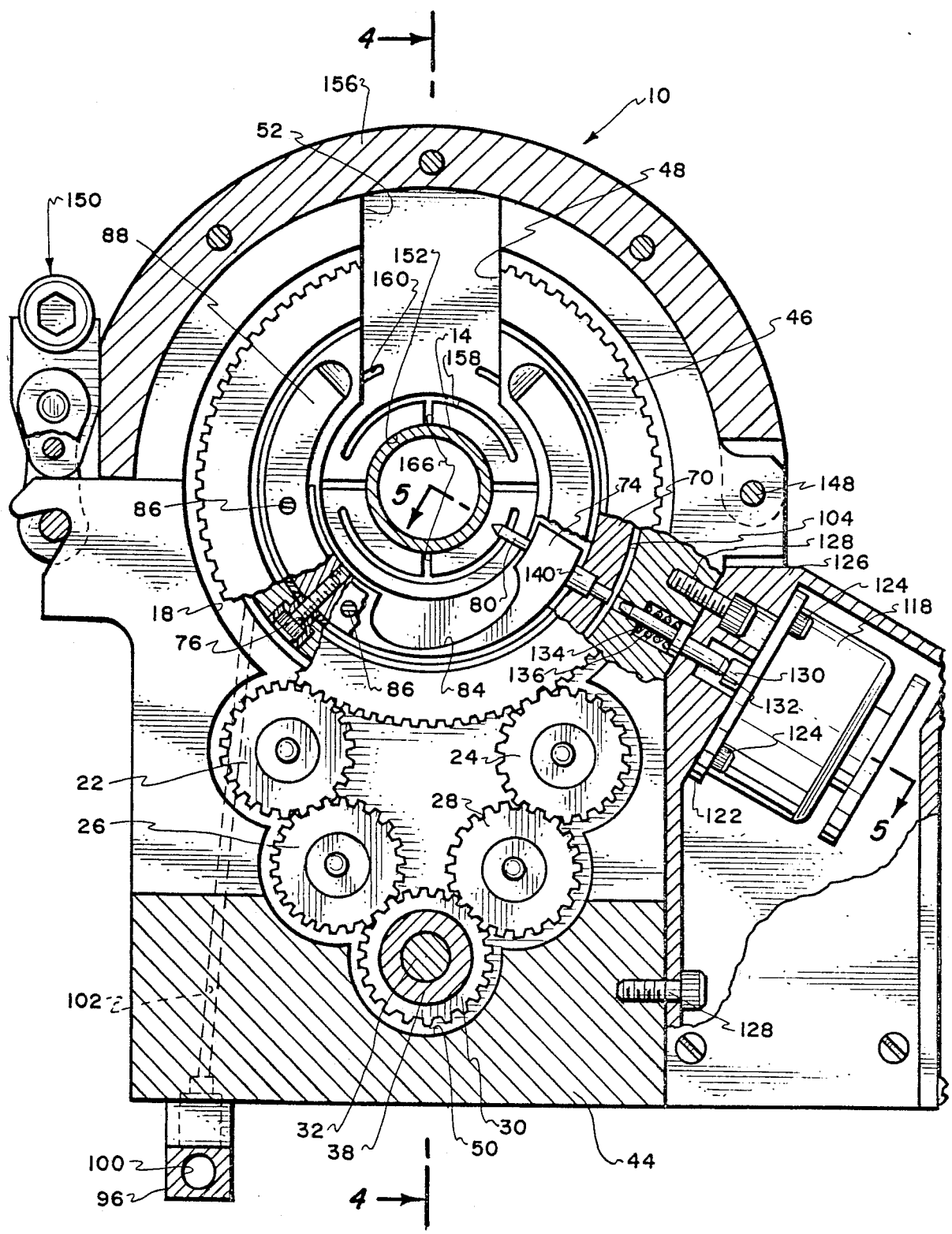
FIG. 3 is a cross-sectional view of the tube welder of the present invention taken along line 3—3 of FIG. 2 showing the welding electrode in the spaced, normal welding, position from the tube to be welded.
Figure 4:
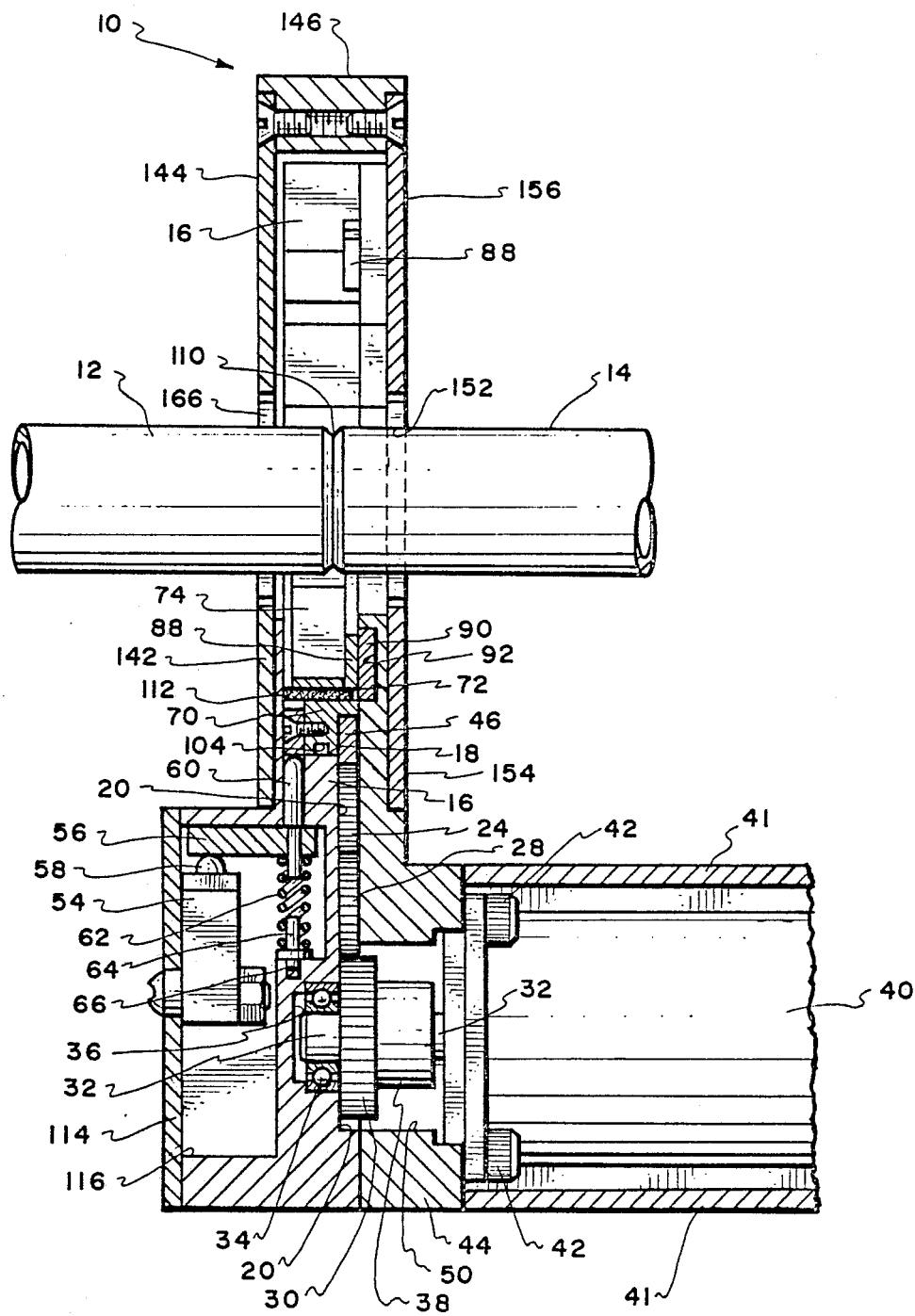
FIG. 4 is a cross-sectional view of the tube welder taken along line 4—4 of FIG. 3.

Referring particularly to the drawings there is shown the tube welder 10 of this invention which is to be used to join together coaxially aligned, abutting tubes 12 and 14. The tube welder 10 includes a main housing 16. The main housing 16 has an open-ended. semicircular opening 18. Connecting with opening 18 is an enlarged recessed area 20. Mounted to the main housing 16 within the recessed area 20 are a pair of spaced apart driving gears 22 and 24. Driving gear 22 is operatively connected to an idler gear 26. Driving gear 24 is operatively connected to an idler gear 28. Gears 26 and 28 are both operatively connected to a driven gear 30. Driven gear 30 is fixedly mounted onto a shaft 32. The free end of the shaft 32 supported by roller bearing assembly 34 within cavity 36 formed within the main housing 16.

Fixedly mounted on the shaft 32 is a sleeve 38. The sleeve 38 abuts against driven gear 30. The inner end of the shaft 32 is to be rotatably driven by a motor (not shown) mounted within motor housing 40. It is to be understood that the motor located within motor housing 40 is to be electrically rotatably driven from a source (not shown). The motor housing 40 is fixedly secured by bolts 42 to a housing plate 44. Housing plate 44 is fixedly mounted onto the main housing 16. Shaft 32, sleeve 38 and a portion of driven gear 30 is located within cavity 50 of housing plate 44. Cavity 50 connects with recessed area 20. Cover 41 surrounds motor housing 40. Cover 41 is secured by bolts 43 to housing plate 44.

The driving gears 22 and 24 are to engage with a spur gear 46. Spur gear 46 is not continuous and includes a gap 48. Also formed within the housing 16 is a similar sized gap 52. As will be explained further on in this specification, the spur gear 46 is to be rotatable relative to the main housing 16. When gap 48 is aligned with gear 22, gear 24 will continue to rotate spur gear 46. Similarly when gap 48 is aligned with gear 24, gear 22 will continue to rotate spur gear 46. This rotation is such that each time the spur gear 46 is stopped, gap 48 precisely aligns with gap 52. This alignment is caused to occur by limit switch 54 which when activated immediately cuts off motor located within motor housing 40. The limit switch 54 is activated by actuating plate 56 being moved against plunger 58 of the limit switch 54. The actuating plate 56 has mounted thereon an actuating pin 60. The actuating pin 60 is to be physically displaced by the protrusion (not shown) mounted on a member that is to be rotatable with the spur gear 46. Once the protrusion contacts the actuating pin 60, the pin 60 is moved which in turn causes movement of the actuating plate 56. This depresses the plunger 58 which activates the limit switch 54 and thereby deactivating the motor contained within the motor housing 40. At this particular time, as previously mentioned, the gap 48 is precisely aligned with the gap 52.

The actuating plate 56 is normally maintained in an extended at-rest position in contact with the main housing 16 by means of coil spring 62. One end of coil spring 62 is located about an inward extension of the actuating pin 60 with the other end of the coil spring 62 connecting with retaining pin 64. The retaining pin 64 is fixed in position within recess 66 formed within the main housing 16.

The spur gear 46 is fixedly mounted by fasteners 68 to a gear housing 70. Gear housing 70 also includes a gap that aligns with gap 48. Gear housing 70 will rotate with gear 46.

The gear housing 70 includes an enlarged central circular shaped opening 72. Within this opening 72 is located an electrode holder 74. The electrode holder 74 is formed into an inner and which is attached to bolts 76 to the gear housing 70. Formed within the outer end of the electrode holder 74 is a hole 78. Within the hole 78 is mounted a welding electrode 80. Welding electrode 80 can be adjusted to any desired position within the hole 78 and, once the desired position is obtained, it is fixed in that position by means of setscrew 82 which is threadably mounted within the electrode holder 74.

In between the ends of the electrode holder 74 there is formed an enlarged recessed area 84. This recessed area 84 is to permit limited deflection of the outer end of the electrode holder 74 relative to the inner end of the electrode holder 74. This deflection will be explained further on in this specification.

Fixedly mounted by screws 86 to the electrode holder 74 is C-shaped electrically conductive member 88. The conductive member 88 does not extend across the gap 48. The function of the conductive member 88 is to receive electrical energy from conductor 90. Conductive member 88 is in continuous electrical contact with the conductor 90. Conductive member 88 is to be movable relative to conductor 90 and is to slide along the surface of conductor 90. Conductor 90 is fixedly mounted within a mating groove 92 formed within the housing plate 44. Conductor 90 includes an upper end which is shaped similar to the C-shaped conductive member 88. Also, the conductor 90 includes an outward extension 94. This extension 94 extends exteriorly the main housing 16 and is attached to a fitting 96. Fitting 96 is attached to a conduit 98. Inert gas from a source (not shown) is to be supplied through the conduit 98 and through the fitting 96 into passage 100. From passage 100, gas is conducted into passage 102 formed within main housing 16. This gas is then discharged from the passage 102 at a gas groove 104 formed within the peripheral surface of gear housing 70. Holes 106 formed within the gear housing 70 are for the purpose of permitting the gas to flow from gas groove 104 to directly adjacent the tip of the welding electrode 80.

Within conduit 98 is located an electrically conductive cable 108. This cable 108 is to be connected to a source of electrical energy (not shown). This cable 108 is electrically connected to outward extension 94. The electrical energy is continuously supplied to conductor 90, hence to conductive member 88, to welding electrode holder 74 and to the welding electrode 80. The welding electrode 80 creates an arc which produces the weld at the weld area 110 between the tubes 12 and 14.

It is necessary that the exterior surface of the conductor 90 be coated with an electrically insulative material (not shown). Such coating is deemed to be conventional. The purpose of the coating is to electrically insulate the conductor 90 from the housing plate 44 so there is no electrical conducting therebetween. The only portions of the conductor which are not coated is of course the point of connection with the cable 108 and the portion of the conductor 90 that connects directly with the electrically conductive member 88.

It is also desired to prevent conducting of electrical energy from the gear housing 70 and the electrode holder 74. Therefore, an electrically insulative tape 112 is mounted between the holder 74 and the gear housing 70.

The limit switch 54 is mounted on the inside surface of a cover plate 114. The limit switch 54, the actuating plate 56, coil spring 62 and retaining pin 64 are located within a chamber 116 formed within main housing 16.

Figure 5:
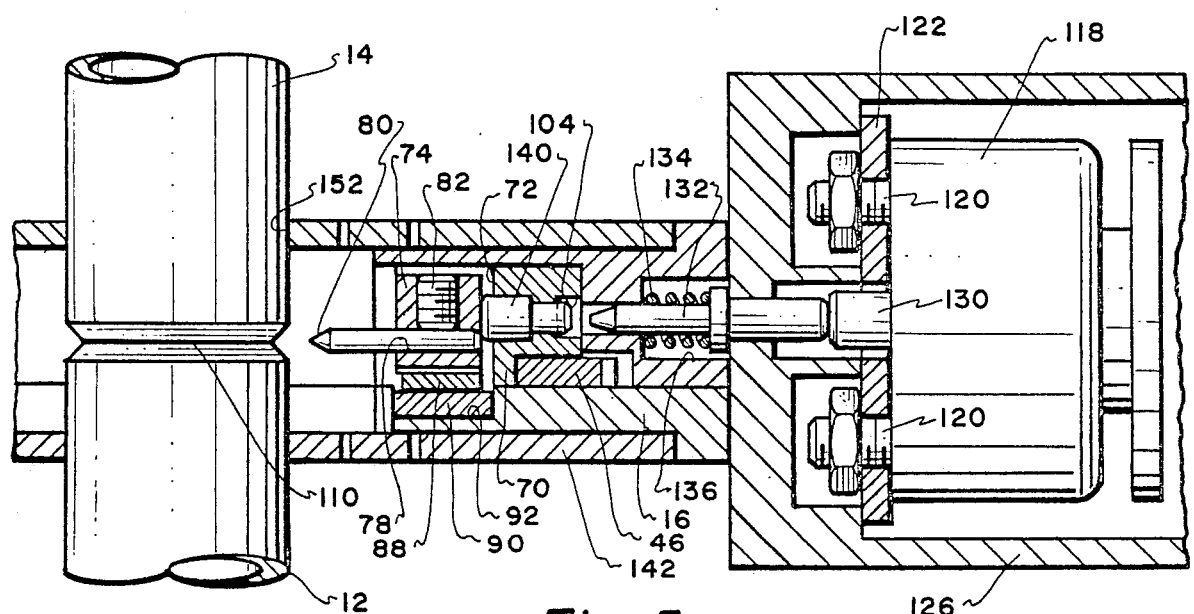
FIG. 5 is a cross-sectional view through the solenoid which is used to affect the movement of the welding electrode taken along line 5—5 of FIG. 3.
Figure 6:
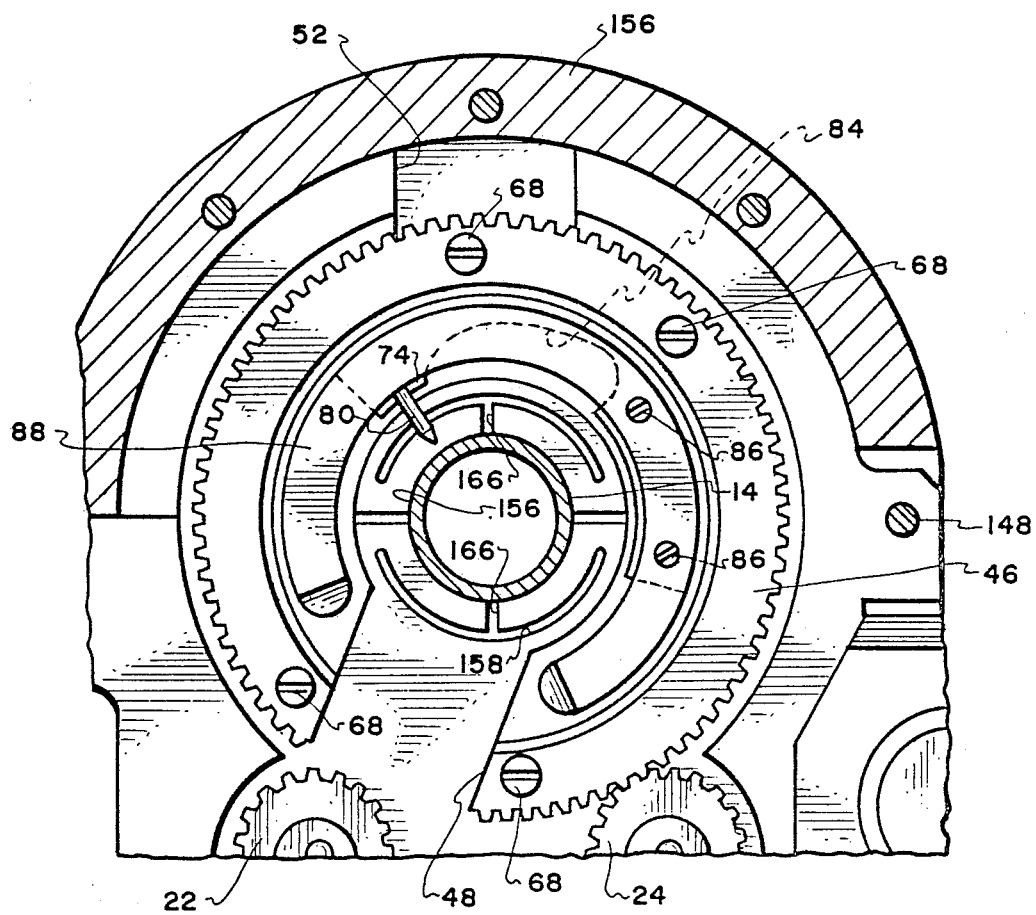
FIG. 6 is a view similar to FIG. 3 of a portion of the tube welder of the present invention showing in more detail the movement of the welding electrode in the circumferential path to achieve the welding operation.

In order to initiate the welding procedure, the desired amount of voltage and current is to be supplied to the electrode 80. This amount of electrical energy will not be sufficient to initiate the arc when the electrode 80 is in the position shown in FIG. 5 of the drawings. However, the arc can be initiated if the tip of the welding electrode 80 is brought into contact with the tubes 12 and 14 in the weld area 110. The moving of the electrode 80 into contact with the weld area 110 is caused by having the outer end of the welding electrode holder 74 physically deflect by bending due to the substantial decrease in thickness of the welding electrode holder 74 caused by recessed area 84. The actual deflection is caused by electrically activating a solenoid (not shown) mounted within solenoid housing 118. Solenoid housing 118 is fixedly mounted by bolts 120 to a mounting plate 122. Mounting plate 122 is in turn mounted by bolts 124 to a cover housing 126. Cover housing 126 is in turn fixedly mounted by bolts 128 to the housing plate 44.

Actuation of the solenoid within the solenoid housing 118 causes extension of a rod 130 a predetermined amount. The extension of rod 130 moves pin 132 the same amount. Pin 132 acts against a coil spring 134 which is mounted within a chamber 136 formed within housing plate 44. The outer end of pin 1 32 is to press against an electrically insulative pin 140. A desirable material of construction for pin 140 would be a glass ceramic. The pin 140 is in direct contact with the electrode holder 74. The amount of extension of the rod 130 is preselected to be just sufficient to move the tip of the electrode 80 from its normal welding position shown in FIG. 3 to the contact position shown in FIG. 3a. Once the arc has been initiated, the solenoid within solenoid housing 118 is deactivated which causes immediate movement of the welding electrode 80 from the contact position to its spaced position in order to create the normal welding procedure.

Mounted on the main housing 16 is a first clamping plate 142. Another first clamping plate 144 is mounted on a clamp housing 146. The mounting of the clamping plates 142 and 144 is by means of conventional bolt fasteners. The clamping plates 142 and 144 are identical. The clamp housing 156 is pivotally mounted by pivot pin 148 to the main housing 16. Diametrically opposite the pivot pin 148 there is mounted an over-center locking mechanism 150. The over-center locking mechanism 150 is to be operated in a conventional manner to securely latch the housing 156 to the main housing 16 as is clearly shown in solid lines within FIG. 1 of the drawings. However, with the over-center locking mechanism 150 moved to an unlatched position, the housing 156 can be pivoted about pivot pin 148 to the dotted line position shown in FIG. 1. When in the dotted line position, access is provided to the through opening 152 which provides for insertion of the tubes 12 and 14 into the through opening 152 with the weld area 100 being in alignment with the tip of the welding electrode 80. When in this position, the clamping plates 142 and 144 cooperate to form a tight secure engagement about tube 12. About tube 14, there is a similar pair of second clamping plates 154 and 156 that function to securely hold in position tube 14. Second clamping plate 154 is securely mounted on housing plate 44 with the second clamping plate 156 being securely mounted onto the clamp housing ? 46. The second clamping plates 154 and 156 are identical to the plates 142 and 144. It is to be understood that clamping plates 142 and 144 each have a centrally located, half circle, indentation which cooperate together to form part of the through opening 152. Each of the clamping plates 154 and 156 also have a centrally located, half circular indentation which cooperate to from part of the through opening 152.

The plates 142, 144, 154 and 156 are constructed to provide for a limited amount of expansion so as to permit snug attachment of the tube welder 10 of this invention onto size variances as reasonably possible in the diameter of the tubes 12 and 14 Of course, tubes 12 and 14 are of the same diameter. In order to provide for this variance, reference is to be had to FIGS. 7a and 7b of the drawings which shows the clamping plates 142 and 144. It is to be understood that discussing the operation of the plates 142 and 144 that it will also apply to plates 154 and 156.

Figure 7A:
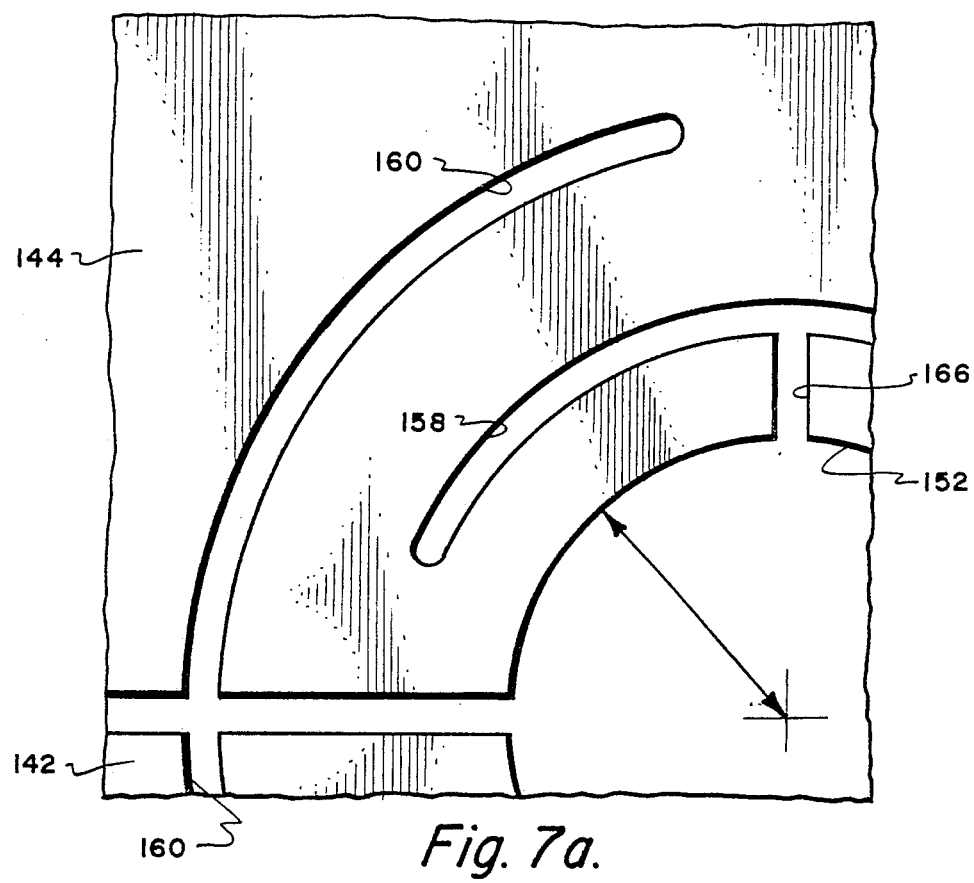
FIG. 7a is an enlarged view of a portion of one of the welding plates showing the welding plate in the non-expanded, at-rest position.
Figure 7B:
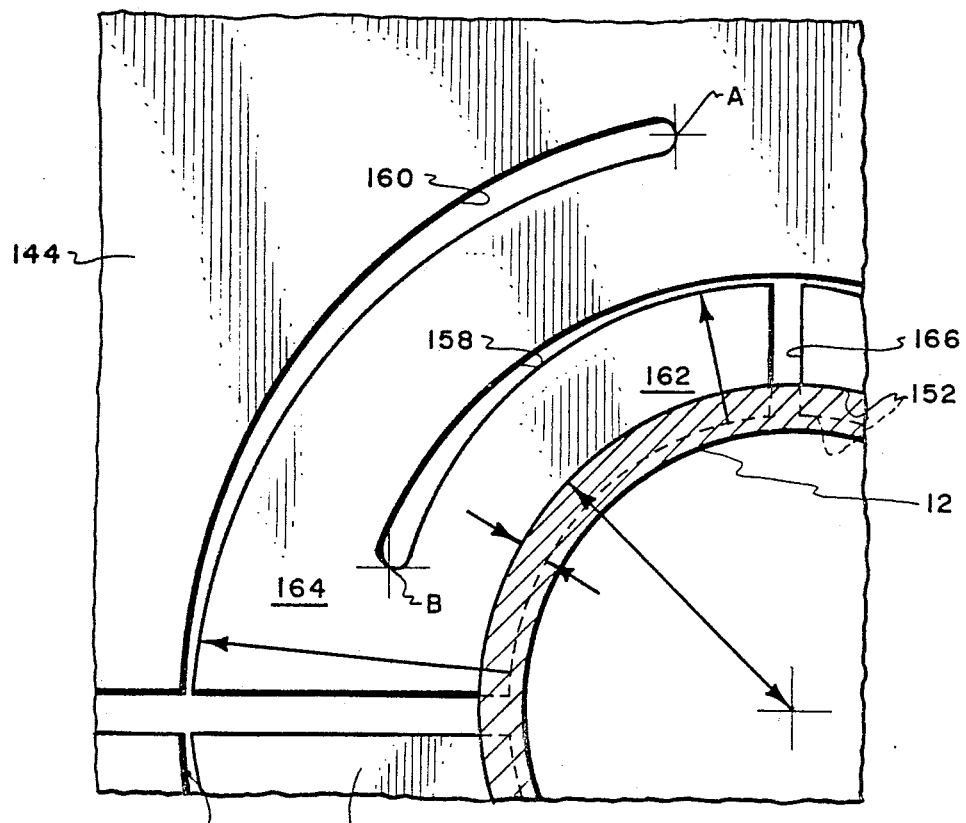
FIG. 7b is a view similar to FIG. 7a, but showing the welding plate being mounted in conjunction with a tube wherein the plate is moved to an enlarged position to facilitate mounting onto the tube to be welded.

Let it be assumed that a maximum allowable diameter of tube 12 has been located within the through opening 152. When the over-center locking mechanism 150 is operated and tightly clamping the tube welder 10 onto the tubes 12 and 14, each quadrant of the plates 142 and 144 will physically deflect with only one quadrant of plate 144 being shown. It is to be understood that each plate 142, 144, 154 and 156 includes two in number of quadrants. This physical deflection is essentially radial. This deflection is permitted to the concentrically locating arrangement of slots 58 and 160, Slots 158 and 160 are slightly spaced apart. As outward pressure is applied against plate 144, there is a tendency for section 162 to deflect from the solid line position shown in FIG. 7a to the solid line position shown in FIG. 7b. The solid line position of FIG. 7a is represented in phantom lines within FIG. 7b. The deflection of section 162 is actually counterclockwise when comparing FIGS. 7a and 7b. This pivoting movement actually occurs about point B shown in FIG. 7b.

At the same time there is a pivoting occurring about point A with this pivoting being clockwise. As a result, section 164, moves from the solid line position shown in FIG. 7a to the solid line position shown in FIG. 7b, with the solid line position of FIG. 7a being shown in phantom lines shown in FIG. 7b. As a result, there is substantially even movement of the quadrant with respect to the tube 12 so that no one portion of the quadrant moves any distance greater than another portion of the quadrant. This even moving is accomplished through the use of the two slots 158 and 160.

It is to be understood that for each pair of clamping plates 142, 144, 154 and 156, there will be four in number of the quadrants. To facilitate the movement of section 162 there is centrally disposed relative to slot 158 the radial slot 166 which connects with the through opening 152. The slot 160 is open-ended at the edge of the plate 144. It is considered to be within the scope of this invention that there may be used a different slot arrangement to achieve the desired expansion of the clamping plates 142, 144, 154 and 156.

What is claimed is:

1. A tube welder comprising:
   a main housing, a through opening formed within said main housing;
   a first clamping plate assembly mounted on said main housing, said first clamping plate assembly comprising one first clamping plate located in a parallel plane with another first clamping plate, each said first clamping plate having a first indentation, said first indentation of a said first clamping plate cooperating with a said first indentation of the other said first clamping plate to form a first center opening;
   a second clamping plate assembly mounted on said main housing, said second clamping plate assembly comprising one second clamping plate located in a parallel plane with another second clamping plate, said second clamping plate having a second indentation, said second indentation of a said second clamping plate cooperating with a said second indentation of the other said second clamping plate to form a second center opening, both said first opening and said second center opening being part of said through opening, both said first clamping plate assembly and said second clamping plate assembly to tightly clamp onto a tube to be welded; and each said first clamping plate including first slot means, each said second clamping plate including a second slot means, said first slot means permitting enlargement of said first center opening to permit snug mounting of each said first clamping plate onto a greater size variance of tubes to be welded, each said second clamping plate permitting enlargement of said second center opening to permit snug mounting of each said second clamping plate onto a greater size variance of tubes to be welded.

2. The tube welder as defined in claim 1 wherein:
said first center opening being of the same size as said second center opening.

3. The tube welder as defined in claim 2 wherein:
said first slot means comprising a pair of concentrically spaced apart separate first slots with therebeing a pair of said first slots formed within each said first clamping plate, said second slot means comprising a pair of concentrically spaced apart second slots with therebeing a pair of said second slots formed within each said second clamping plate.

* * * * *